United States Patent
Powell et al.

(10) Patent No.: US 11,193,694 B2
(45) Date of Patent: *Dec. 7, 2021

(54) COMBINATION SYSTEMS AND RELATED METHODS FOR PROVIDING POWER, HEAT AND COOLING

(71) Applicant: Enginuity Power Systems, Alexandria, VA (US)

(72) Inventors: Gregory Powell, Rockville, MD (US); James C. Warren, Alexandria, VA (US)

( * ) Notice: Subject to any disclaimer, the term of this patent is extended or adjusted under 35 U.S.C. 154(b) by 84 days.

This patent is subject to a terminal disclaimer.

(21) Appl. No.: 16/818,009

(22) Filed: Mar. 13, 2020

(65) Prior Publication Data
US 2020/0224925 A1    Jul. 16, 2020

Related U.S. Application Data

(63) Continuation-in-part of application No. 15/621,711, filed on Jun. 13, 2017, now Pat. No. 10,337,452, and a continuation of application No. 15/974,679, filed on May 8, 2018, now Pat. No. 10,605,483.

(60) Provisional application No. 62/419,188, filed on Nov. 8, 2016, provisional application No. 62/349,346, filed on Jun. 13, 2016.

(51) Int. Cl.
| | | |
|---|---|---|
| *F24H 1/20* | (2006.01) |
| *F24H 1/18* | (2006.01) |
| *F24H 1/52* | (2006.01) |
| *F24H 9/18* | (2006.01) |
| *F24H 9/00* | (2006.01) |

(52) U.S. Cl.
CPC ............. *F24H 1/208* (2013.01); *F24H 1/186* (2013.01); *F24H 1/52* (2013.01); *F24H 9/0084* (2013.01); *F24H 9/1836* (2013.01); *F24H 2240/01* (2013.01); *F24H 2240/06* (2013.01)

(58) Field of Classification Search
CPC . F24H 1/208; F24H 1/186; F24H 1/52; F24H 9/0084; F24H 9/1836; F24H 2240/01; F24H 2240/06
See application file for complete search history.

(56) References Cited

U.S. PATENT DOCUMENTS

| | | |
|---|---|---|
| 1,230,617 A | 6/1917 | Still |
| 6,730,274 B1 * | 5/2004 | Ideguchi ............... F01N 3/2889 422/173 |
| 2002/0095939 A1 | 7/2002 | Gordon et al. |
| 2004/0173164 A1 | 9/2004 | Denis |
| 2004/0221823 A1 | 11/2004 | Warren |
| 2007/0101716 A1 | 5/2007 | Tafas |
| 2011/0041784 A1 | 2/2011 | McAlister |

(Continued)

FOREIGN PATENT DOCUMENTS

| | | |
|---|---|---|
| DE | 41 37 517 | 5/1993 |
| DE | 10 2011 100650 | 8/2012 |

(Continued)

*Primary Examiner* — Shafiq Mian
(74) *Attorney, Agent, or Firm* — Capital Patent & Trademark Law Firm

(57) ABSTRACT

A combined heat, cooling and power system is configured to generate energy as well capture a large percentage of energy that would otherwise be lost using components, including heat transfer components, embedded within a vessel to transfer energy in the form of heat to liquid within the vessel.

10 Claims, 12 Drawing Sheets

(56) References Cited

U.S. PATENT DOCUMENTS

| | | |
|---|---|---|
| 2013/0047639 A1 | 2/2013 | Stannard et al. |
| 2013/0139507 A1 | 6/2013 | Morse |
| 2016/0230643 A1* | 8/2016 | Honda .................... F01P 9/02 |
| 2017/0356310 A1 | 12/2017 | Powell et al. |

FOREIGN PATENT DOCUMENTS

| | | |
|---|---|---|
| GB | 2 500 440 | 9/2013 |
| WO | WO 2005/026511 | 3/2005 |

* cited by examiner

COMBINATION SYSTEMS AND RELATED METHODS FOR PROVIDING POWER, HEAT AND COOLING

CROSS-REFERENCE TO RELATED APPLICATIONS

This application is a continuation of U.S. patent application Ser. No. 15/974,679 filed May 8, 2018 ("'679 Application) which is a continuation-in-part of U.S. application Ser. No. 15/621,711 filed Jun. 13, 2017 (the "'711 Application") This application incorporates by reference herein the entire disclosures of the '679, and '711 Applications and U.S. Provisional Patent Applications Ser. Nos. 62/349,346 filed on Jun. 13, 2016 and 62/419,188 filed on Nov. 8, 2016 as if they were set forth in full herein.

INTRODUCTION

A continuing challenge is to economically provide energy while yet reclaiming various aspects of the energy development such as heat. Yet another challenge is to reduce carbon emissions when operating combustion engines to produce energy such as electrical energy. Oftentimes, heat generated by combustion within the engine is wasted. Furthermore, challenges such as packaging and engine efficiency remain as design concerns in the development of combined heat and power systems.

Other challenges include complying with the relevant EPA or other environmental regulatory references when providing in-home or in-dwelling engines used to power a combined heat and power system. Accommodating all of these concerns within one energy unit remains an ongoing challenge.

Accordingly, it is desirable to provide for systems, devices and related methods that accommodates the above concerns within a single system.

SUMMARY

The above-referenced challenges are resolved by embodiments of the present invention. Unique systems, devices and related methods that convert mechanical energy into electricity and produce heat in three ways: through the engine exhaust stream, through the engine coolant stream, and by radiant or convective heat.

An embodiment of the present invention may be directed at a combined heat, cooling and power system that comprises: (i) an energy generation sub-system comprising a replaceable engine connected to a plurality of generators and a turbo-generator, the sub-system operable to generate electricity and exhaust gases, and provide energy to an energy storage sub-system, and a vessel for storing liquid, the liquid heated by waste heat from the engine; (ii) an energy distribution sub-system comprising, coils operable to circulate heated coolant received from the energy generation sub-system, and, fans operable to direct air over the coils to heat the directed air, and operable to distribute the heated air; and (iii) an energy storage sub-system operable to receive and store the energy from the energy generation sub-system.

In an embodiment, the energy storage sub-system may comprise a battery operable to discharge stored energy to the energy distribution sub-system or to an electrical utility grid. Further, the turbo-generator may be operable to receive exhaust gases from the engine and convert the exhaust gases to electricity, yet further, the turbo-generator may be configured at a position between the engine and a catalytic converter to protect the converter from extremely high temperatures emitted from the engine.

In an embodiment, the exemplary system may comprise the catalytic converter embedded in the vessel, where the converter may be configured to be positioned within a distance from the engine, where a temperature of the exhaust gases optimizes the operation of the catalytic converter, and, still further a muffler embedded in the vessel and operable to reduce a level of sound from the engine and the exhaust gases.

To capture heat that may otherwise be wasted or escape, the system may further comprise an exhaust heat exchanger that may operable to transfer heat within the exhaust gases to liquid within the vessel, and a coolant heat exchanger operable to transfer heat from coolant to the liquid within the vessel.

In yet another embodiment, a similar system may further comprise (i) an air intake section configured to be positioned so that external air from outside the energy generating sub-system may be drawn into a cowling and over the engine and generators in order to cool the engine and pre-heat the air, and (ii) thermo-acoustic insulation configured inside the cowling, the insulation operable to prevent sounds emanating from inside the cowling from escaping the cowling.

In addition to the systems described above, the present invention provides related methods, such as a method for providing heat, cooling and power that comprises: generating electricity and exhaust gases from an engine, and providing energy to an energy storage sub-system (e.g., a battery); storing a liquid, heated by waste heat from the engine, in a vessel; circulating heated coolant through coils and directing air over the coils to heat the directed air; distributing the heated air; and receiving and storing the energy in the energy storage sub-system.

Such an exemplary method may further comprise discharging the stored energy to an energy distribution sub-system or to an electrical utility grid as needed or desired.

A further method may comprise one or more of the processes just described and, in addition, receiving exhaust gases and converting the exhaust gases to electricity using a turbo-generator configured at a position between the engine and a catalytic converter, where the catalytic converter may be embedded in the vessel at a position where a temperature of the exhaust gases optimizes the operation of the catalytic converter. Yet further, in addition to embedding a converter, such a method may comprise embedding a muffler in the vessel to reduce a level of sound from the engine and the exhaust gases.

To capture heat that is derived from operation of an engine, among other components, that may otherwise be wasted or escape the method may further comprise transferring heat within the exhaust gases to a liquid within the vessel and transferring heat from coolant to the liquid within the vessel.

Finally, but without limitation, yet another method may combine one or more the processes described above along with (i) positioning an air intake section so that external air is drawn over the engine in order to cool the engine and pre-heat the air, and (ii) preventing sounds emanating from inside a cowling from escaping the cowling.

Figure 1:
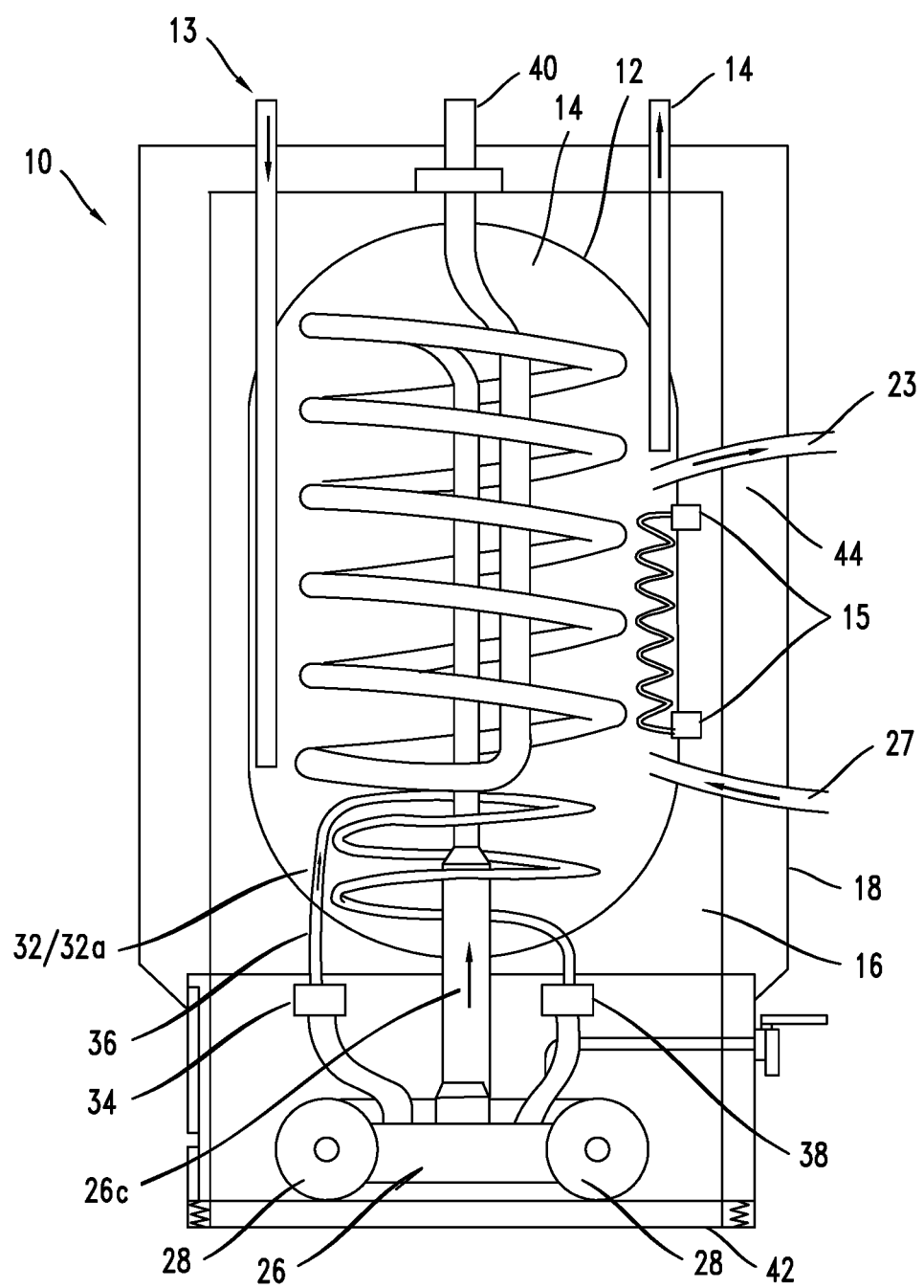
FIG. 1 illustrates an exemplary combined heat, cooling and power system in accordance with an embodiment of the present invention.

To the extent that any of the figures or text included herein depicts or describes dimensions, sound levels, power levels, efficiencies or other operating parameters it should be understood that such information is merely exemplary to aid the reader in understanding the embodiments described herein. It should be understood, therefore, that such information is provided to enable one skilled in the art to make and use an exemplary embodiment of the invention without departing from the scope of the invention.

It should be understood that, although specific exemplary embodiments are discussed herein, there is no intent to limit the scope of the present invention to such embodiments. To the contrary, it should be understood that the exemplary embodiments discussed herein are for illustrative purposes, and that modified and alternative embodiments may be implemented without departing from the scope of the present invention. Exemplary embodiments of systems, devices and related methods for providing power, heat and cooling are described herein and are shown by way of example in the drawings. Throughout the following description and drawings, like reference numbers/characters refer to like elements.

It should also be noted that one or more exemplary embodiments may be described as a process or method. Although a process/method may be described as sequential, it should be understood that such a process/method may be performed in parallel, concurrently or simultaneously. In addition, the order of each step within a process/method may be re-arranged. A process/method may be terminated when completed and may also include additional steps not included in a description of the process/method.

As used herein, the term "and/or" includes any and all combinations of one or more of the associated listed items. As used herein, the singular forms "a," "an" and "the" are intended to include the plural form, unless the context and/or common sense indicates otherwise.

As used herein, the term "embodiment" and/or "exemplary" refers to an example of the present invention.

Embodiments of the present invention include a four-stroke, opposed-piston engine to provide energy from the thermo-dynamic transfer of heat energy created during the operation of the engine. Although not necessarily so limited, an exemplary engine may be a four-stroke opposed piston engine that utilizes a fuel other than diesel, such as gasoline, propane, or natural gas, for example. Certain efficiencies are realized with the use of an opposed-piston configuration, particularly when a four-stroke engine is employed. It has been found that packaging efficiencies are improved, thereby resulting in a more-compact energy unit. Further, it has been found that a four-stroke opposed piston engine is compliant with pertinent environmental regulations of the EPA.

Referring to FIG. 1, an energy recovery system 10 may include an engine 26 that produces heat in both the exhaust stream and in a coolant stream, the features of which may be described in more detail in the '711 Application incorporated by reference herein. A housing 20 contains a first pressure vessel 12 containing a first fluid or liquid 14, such as water. A second pressure vessel 16 also contains a second fluid or liquid 18 such as water. The second vessel 16 may be a boiler formed such as described in U.S. Pat. Nos. 8,763,564 or 9,303,896, for example, the teachings of which are herein incorporated by reference as if fully stated. The first vessel or boiler 12, which in one embodiment is essentially formed as a hot water tank in a known manner, is surrounded by the second vessel 16, and is actually immersed within the fluid 18 of the second vessel 16. The second vessel 16 or hot water storage tank, may be formed as a hot water tank in a known manner, and contains a cold-water inlet 22 and a hot water outlet 24. An exemplary engine 26, such as a four-stroke opposed piston engine as described below but not restricted to that design, is also contained within the housing 20 but not within either pressure vessel 12, 16, and provides combustion energy to produce electricity. At least one generator 28 is combined with the engine 26 in a known way, and when combined forms an exemplary "genset" 26/28, as schematically shown in FIG. 1. In the embodiment depicted in FIG. 1 the genset comprises a dual generator 26/28 in accordance with the present invention. It has been found that the efficiencies presented by the novel gensets 26/28 described herein provide synergistic efficiencies with regard to recovering waste heat through the present energy recovery system, environmental advantages, and packaging efficiencies.

In accordance with embodiments of the present invention, the engine 26 also produces waste heat that is directed from the engine 26 through an engine exhaust vent or duct during operation of the engine 26, as exhaust 26c. A first heat exchanger 30 is configured within the first storage tank/pressure vessel 12 and fluidly communicates with the engine 26 whereby engine exhaust 26c is directed from the engine 26 through the first heat exchanger coil 30a as shown in FIG. 1, and then out a vent 40 from the housing 20. The first heat exchanger coil 30a may be formed from a thermally conductive material such as a metal, stainless steel for example, that thermally conducts heat into the fluid or water of the first storage tank/pressure vessel 12. A second heat exchanger 32 is configured within the second storage tank/pressure vessel 16, and fluidly communicates with the engine whereby engine coolant 32b is directed through the second heat exchanger coil 32a. The second heat exchanger coil 32a may be formed from a thermally conductive material such as a metal, copper or brass for example. As shown in FIG. 1, a compressor 34 is connected to a coolant outlet 26a and a coolant inlet 26b on the engine, such that heated coolant 36 may be pumped from the engine 26, compressed and further heated, and then passed through the second heat exchanger 32 within the second pressure vessel 16. As the coolant passes through the second heat exchanger, the coolant is cooled to transfer heat to the second fluid 18, water, or liquid within the second pressure vessel 16. Once the coolant 36 has travelled through the second heat exchanger 32, and prior to the coolant 36 being reintroduced into the engine 26, the coolant 36 is passed through an expander valve 38 to thereby expand the coolant 36 to an even cooler state as it reenters the engine 26 through coolant inlet 26b. Also shown is a hot fluid exit 23 from vessel 16 and a cooled fluid inlet 27 to vessel 16, representing a closed loop to a furnace and associated heat exchanger, for example. Accordingly, the present system recovers heat from both the exhaust and coolant systems of the engine.

Unless otherwise stated herein, such as with the details of the four-stroke opposed-piston engine or with the details of the heat exchangers 30 and 32, the Combined Heat and Power (CHP) system shown in FIG. 1 may be constructed as known in the art. Accordingly, U.S. Pat. Nos. 9,617,897, 9,097,152, 6,823,668, 7,021,059, and 7,574,853 are instructional and are herein incorporated by reference in their entireties. Further, U.S. Patent Publication Nos. 2016/0194997, 2009/0205338, and 2013/0247877 are instructional and are herein incorporated by reference in their entireties. Finally, EP2503110 and WO 2011/028401 are also instructional, and are herein incorporated by reference in their entireties.

As shown in FIG. 1, the exhaust from the first heat exchanger is vented from the boiler or first vessel 12 through a boiler exhaust. As the water is heated within the water storage tank or first vessel 12, hot water 14 is pumped out to provide hot water for a variety of applications, and cold makeup water 13 is introduced into the water storage tank or first vessel 12. As also schematically shown in FIG. 1, a temperature controller 15 may control the temperature of the water 14 in the hot water tank 12, and in the boiler 16. Accordingly, the operation of the engine may be coordinated with the temperature control system by increasing or decreasing the engine operating cycles/minute, respectively. An outer housing 44 is preferably formed about the combined heat and power system 10, thereby forming a soundproof enclosure.

Figure 3:
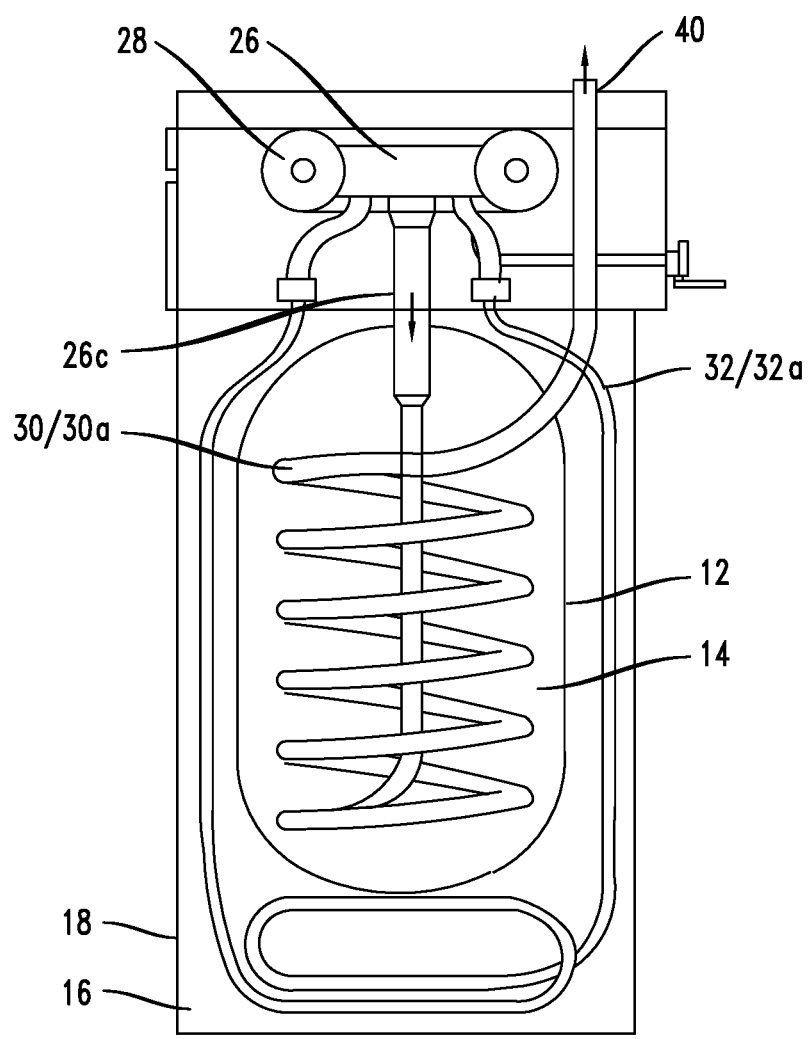
FIG. 3 illustrates yet another exemplary combined heat, cooling and power system in accordance with an embodiment of the present invention.

In an embodiment, it will be appreciated that an exhaust conduit 527e (see FIG. 7) of the engine 26 and the heat exchange coil 32a may be proximate to each other to optimize convection and maximize heat recovery through heat transferred from the engine exhaust to the fluid 18 within the second pressure vessel 16 (see FIG. 3).

As also schematically shown in FIG. 1, the combined system 10 may contain a suspension or dampening system 42 to mitigate the effects of the vibration of the engine 26 in the home or office for example. Related thereto, vibration-resistant couplings for the intake, radiator, exhaust, and fuel supply of the engine 26 may also be integrated into the dampening system 42 as schematically shown in FIG. 1.

Figure 2:
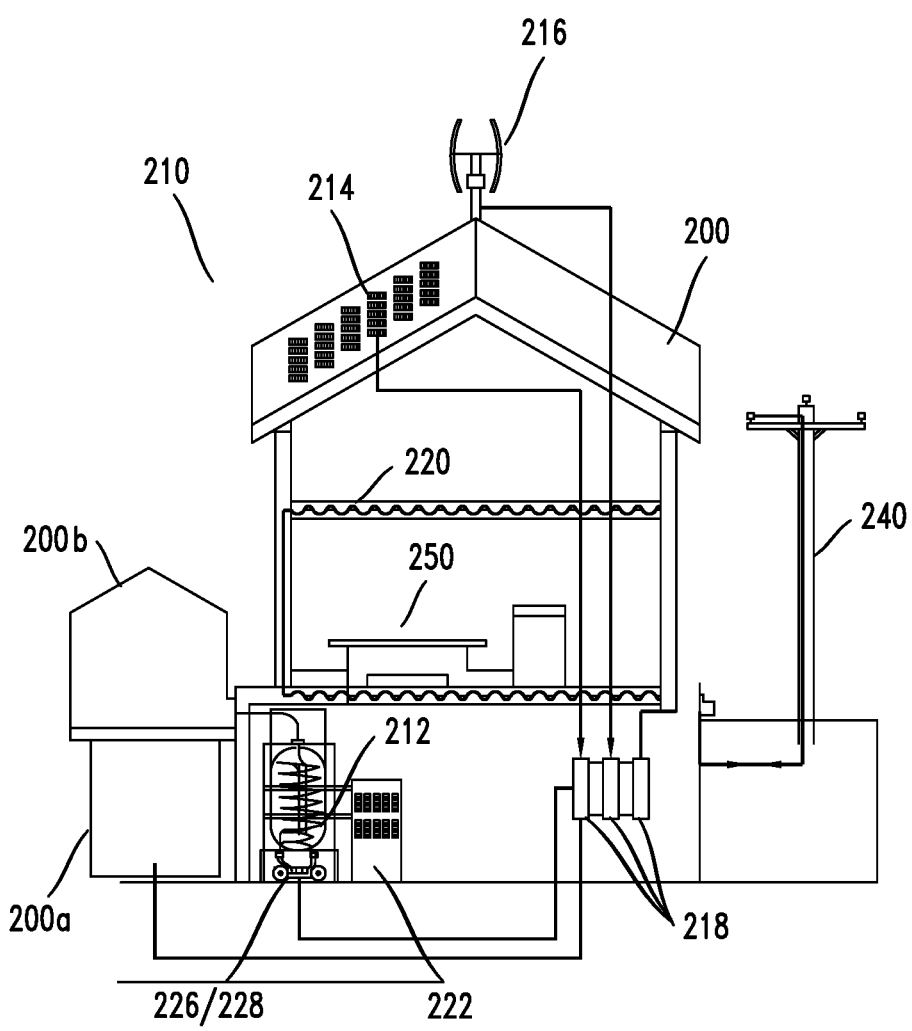
FIG. 2 illustrates application of reclaimed heat of the combined heat, cooling and power system of FIG. 1 in accordance with an embodiment of the present invention.

Referring now to FIG. 2, there is depicted an exemplary combined heat, cooling and power system 210 that is operable to provide electricity that may be used to power various equipment 250 around a dwelling or house 200, including driveway 200a and a greenhouse 200b. As also shown, hot water from the hot water tank 212 may be used to heat the dwelling 200 through radiant floor heaters 220, and/or to augment the heat provided by a furnace 222 through heat exchange at the furnace 222, and/or to heat a pool (not shown), among other hot water applications, including supplying heat that can be used to supply hot water throughout the house 200, for example. Other energy collectors, such as solar panels 214 that provide photovoltaic energy, wind turbines 216 that provide rotary power, and so forth may be integrated to form a total energy storage system.

In an embodiment, excess energy from the engine/generator or genset 226/228, the solar panels 214, and the wind turbine 216 may be stored in a battery pack 218. Furthermore, excess energy may be sold back to the existing power grid 240 as needed.

Figure 4:
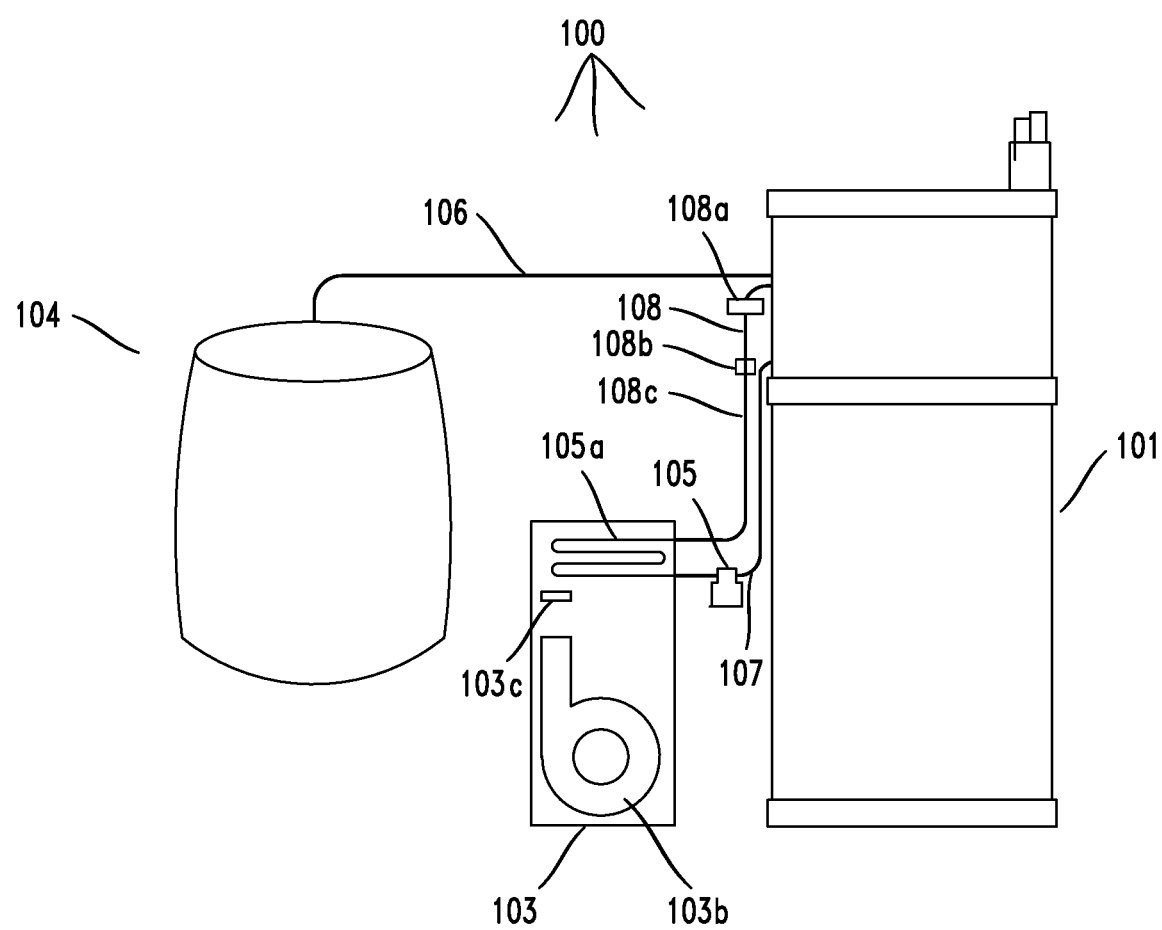
FIG. 4 depicts an exemplary combined heat, cooling and power system that comprises energy storage and distribution capabilities.

Referring now to FIG. 4, there is depicted an exemplary, combined heat, cooling and power system 100 in accordance with an embodiment of the invention.

As depicted the system 100 may include a plurality of sub-systems, such as an energy generation sub-system 101, an energy distribution sub-system 103 and an energy storage sub-system 104. In an embodiment, the energy distribution sub-system 103 may comprise an air handling sub-system while the energy storage sub-system 104 may comprise a battery, for example (e.g., exemplary capacity 6 kilowatts to 20 kilowatts).

In an embodiment, the energy generation sub-system 101 may be operable to generate energy through the operation of an engine described elsewhere herein as well as in the '711 Application. In an embodiment, the energy generated by the sub-system 101 may be used to generate power (e.g., electricity), and/or heat water, for example. Further, as explained in more detail herein, the sub-system 101 may be operable to capture or re-capture (collectively "capture") some of the energy used to generate power, and heat water, for example.

As depicted, provided the energy generation sub-system 101 has a connected energy source (e.g., natural gas), the sub-system 101 may generate electricity and provide the electricity to a dwelling or house, such as dwelling 200 in FIG. 2, In addition, sub-system 101 may be operable to provide energy to the energy storage sub-system 104 in order to charge or re-charge (collectively "charge") the sub-system 104. Upon receiving the energy from sub-system 101, the sub-system 104 may be operable to store the energy and, when desired, discharge the stored energy at a later time to provide power to sub-system 103, for example, or back to an electrical utility grid.

In an embodiment, the energy distribution sub-system 103 may be operable to function in combination with, or independently of, the sub-system 101.

For example, in one scenario the energy generating sub-system 101 may comprise an engine 128 connected to power a plurality of generators 128a,b and a turbo-generator 128c (see FIG. 5) operable to generate electricity that may be provided to a house or dwelling 200, for example, shown in FIG. 2. However, as noted elsewhere herein, as the engine 128 (and generators to some extent) is operating it also generates a substantial amount of heat that, in traditional systems would not be used (i.e., it would be wasted). In embodiments of the invention, such waste heat may be captured and used to heat a liquid (e.g. water) stored within a hot water storage tank or vessel 120 (see FIG. 5) within sub-system 101 or be further provided to the energy distribution sub-system 103 to provide heated air to the dwelling or house 200.

In more detail, and as explained elsewhere herein, heat in the form of (i) exhaust gases output from the engine 128 upon burning an energy source and (ii) heated coolant may flow away from the engine 128 and its surrounding area and eventually be fed to the vessel 120 (see FIG. 5) and sub-system 103. Thus, as explained in more detail elsewhere, heat that would normally be lost is captured and used to heat water in the vessel 120, and provide heat to the dwelling or house 200, among other things.

In an embodiment, the temperature of vessel 120 may be monitored by temperature and pressure controls (not shown in figures) to ensure that the temperature of the vessel 120 does not rise above a certain variable threshold. In one example, such a variable threshold may comprise a temperature between 140° F. and 160° F.

In an embodiment, the controls may be operable to determine that the temperature of the water 120a within the vessel 120 is approaching or at a certain vessel threshold. Accordingly, the controls may send signals to a pump 108a and by-pass valve 108b (see FIG. 4) to open the by-pass valve and to direct heated coolant within piping 132 (see FIG. 5) that would otherwise flow through water 120a within vessel 120 to sub-system 103 via piping 108c. Thus, by re-directing the heated coolant away from the vessel 120, the water within vessel 120 will begin to cool.

Upon receiving the heated coolant via piping 108c, the sub-system 103 may be operable to direct the heated coolant within piping 108c to coils 103a. The coils 103a are operable to circulate the heated coolant, and as the coolant is circulating, fans 103b within the sub-system 103 may be operable to direct air over the now heated coils to cool the coils and the coolant inside the coils. Conversely, the heated coolant (e.g., water) inside the coils heats the air flowing across the coils.

In an embodiment where the dwelling or house 200 desires heating, the now heated air that was directed over the coils may be forced, through the operation of fans 103b out of the sub-system 103 into conduits or other ventilation equipment to be distributed throughout the house or dwelling 200.

Thus, in this embodiment, the heat within the coolant that is sent to the sub-system 103 can be captured and distributed by the sub-system 103 to further warm the house or dwelling 200. However, in the event that the dwelling or house 200 is not in need of heated air, the heated air may be discharged to the exterior of the dwelling or house 200 via means known in the art.

Yet further, as indicated above the heated coolant may traverse through coils 103a and be cooled by the air flowing across the coils 103a. In an embodiment, the now cooled coolant may be output from the sub-system 103 via output piping 107 and sent to (i.e., returned to) the sub-system 101 and, particular, sent to the vessel 120 and piping 132 at a reduced temperature (e.g. 100° F.). In FIG. 4, the sub-system 103 is depicted as including a pump 105 that may be operable to apply a pressure to the cooled water exiting the sub-system 103 via piping 107 so as to return the water to the sub-system 101 under an acceptable pressure.

In the above scenarios, the sub-systems 101,103 work in combination to, for example, control the operating temperature of the vessel 120, and to provide energy (heat) from the vessel 120 that can be distributed to the dwelling or house 200 by the sub-system 103.

In alternative embodiments, each of the sub-systems 101, 103 may operate independently of one another.

For example, sub-system 103 may comprise temperature controls 103c that are operable to control the "on" and "off" operation of sub-system 103 independent of the operation of sub-system 101. Said another way, controls 103c may be operable to control whether sub-system 103 provides forced heated air to the dwelling or house 200. In more detail, in one embodiment the controls 103c may comprise sensors (not shown in figures) operable to detect the temperature of the air within dwelling or house 200. If the temperature detected by the sensors falls below a dwelling threshold temperature (e.g., 65° F.), then the sensors may send signals to the controls 103c that, in turn, send signals to the fan(s) 103b to turn the fans "on" and force heated air into the air distribution system of the dwelling or house 200 to warm the house, for example. Conversely, once the temperature of the air within the dwelling or house 200 detected by the sensors rises to meet, or exceed, a dwelling threshold (the same or a different threshold), then the sensors may send signals to the controls 103c that, in turn, send signals to the fans 103b to turn the fans "off" and which prevents heated air from entering the air distribution system of the dwelling or house 200. In the scenario just described, the sub-system 103 operates independently of the subsystem 101 because its operation is not dependent upon the operation of the sub-system 101 (e.g., not dependent upon the temperature of the vessel 120).

Yet further, in an embodiment, when sub-system 103 is operating but the engine 128 and generators 128a,b of sub-system 101 are not operating, the energy storage sub-system 104 may be operable to provide energy (e.g. electricity) to the sub-system 103 in order to power the fans 103b while the vessel 120 via piping 108 may be operable to provide heated water to coils 103a of sub-system 103. Accordingly, fans 103b may operate to force air over coils 103a to provide heat to the dwelling or house 200.

The scenarios above are just of the many possible scenarios were the sub-systems 101,103 work in combination or independently of one another.

Figure 5:
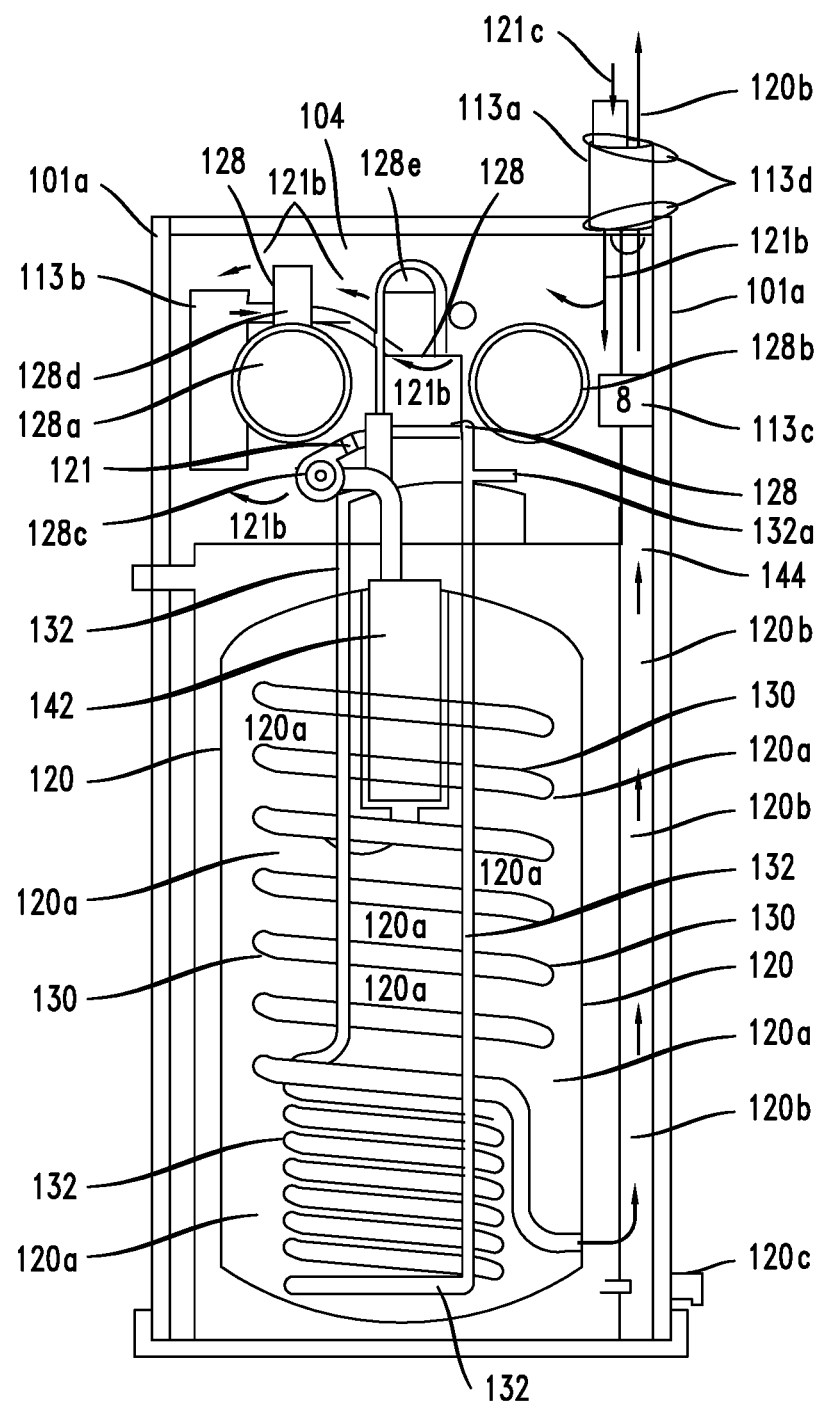
FIG. 5 depicts a cross-sectional view of an exemplary energy generation sub-system of an exemplary combined heat, cooling and power system in accordance with an embodiment of the present invention.

Referring now to FIG. 5 there is depicted a detailed view of an exemplary, energy generating sub-system 101 according to an embodiment of the invention. As shown, the energy generating sub-system 101 may comprise the aforementioned engine 128 and connected generators 128a,b, where each generator 128a,b may be operable to generate energy in the form of electricity. The sub-system 101 may also include an additional generator—turbo-generator 128c—along with muffler and catalytic converter unit 142, storage vessel 120, exhaust heat exchanger 130 (e.g. coils), coolant heat exchanger 132 (e.g., coils), intake air filtration unit 113b, and thermo-acoustical insulation 144 among other elements. In an embodiment, the muffler and catalytic converter unit 142, exhaust heat exchanger 130 and coolant heat exchanger 132 may be embedded within the vessel 120 in order to transfer heat from such components to liquid (e.g., water) inside the vessel 120 in order to capture energy in the form of heat from operation of the engine 128

Exemplary details of the structure, features and functions of the engine 128 is set forth elsewhere herein as well as in the '711 Application. Presently the discussion that follows will focus on the operation of the engine 128 in combination with the other elements of the sub-system 101. However, before continuing it should be noted that in embodiments, "quick connect/disconnect hardware" (not shown in figures) may be included within sub-system 101 to facilitate easy removal of the engine 128.

In more detail, in one embodiment the engine 128 may be attached to a tray by means of pins (not shown in figures) operable to slide out to facilitate complete removal of the engine 128 when service requires that work be performed that is beyond what is possible in the field. In addition to these methods, wiring harnesses connected to the engine 128 or the generators 128*a,b* may comprise a pin-and-socket configuration that function to be easily separated by an individual in the field using existing tools. The combination of these features results in an engine 128 that can be replaced within hours, for example, when necessary.

In an embodiment, during operation the engine 128 and generators 128*a,b* may be operable to produce "waste" heat in the form of an exhaust gases (hereafter referred to as "exhaust") that is directed from the engine 128 to an exhaust pipe 121 and eventually to turbo-generator 128*c*. Further, additional "waste" heat may be created within and on the surface of the engine 128. In embodiments, the sub-system 101 may be configured to capture all sources of waste heat.

Turning first to the exhaust, in an embodiment the turbo-generator 128*c* may be operable to (i.e. function to) receive the exhaust and convert the exhaust to an additional electricity amount (e.g., 1-2 kilowatts) over and above the electricity generated by generators 128*a,b*.

In an embodiment, the turbo-generator 128*c* may be configured to be located at the output of the exhaust piping 121, substantially close to the output of the engine 128, in order to maximize the conversion of exhaust from the engine 128 into electricity. Accordingly, the length of the exhaust piping 121 may be configured to be a length that allows for such maximized conversion. In an example, the length of the exhaust piping 121 may be (e.g., 1 to 3 inches).

In embodiments, the turbo-generator 128*c* may be further configured to be positioned at a location to convert exhaust energy into electricity prior to the exhaust contacting the muffler-catalytic converter unit 142, That is to say, the turbo-generator 128*c* may be positioned between the engine 128 and unit 142. This configuration functions to protect the muffler-catalytic converter unit 142 from damage due to the extremely high-temperatures of the exhaust that is output from the engine, thus extending the life of the unit 142.

For example, the exhaust may exit an exhaust manifold (not shown in FIG. 5) of the engine 128 at approximately 1,600° F. At this temperature the exhaust may damage elements of the catalytic converter 143*a* within unit 142. Accordingly, to prevent such damage the inventors provide embodiments that places the turbo-generator 128*c* in between the catalytic converter 143*a* and the engine 128. Unlike the catalytic converter 143*a*, the turbo-generator 128*c*, may be operable to receive the exhaust at this temperature without being damaged. Accordingly, the exhaust from the exhaust valve may flow through vanes (not shown) of the turbo-generator 128*c*.

Upon exiting the turbo-generator 128*c*, the temperature of the exhaust is approximately 1,200° F. as is flows to the muffler/catalytic converter 142. Accordingly, in one embodiment the temperature and pressure of the exhaust may be reduced by passing the exhaust through the turbo-generator 128*c* prior to passing to the unit 142. It should be noted that while temperatures at 1,500° F. may damage the catalytic converter 143*a*, converters provided by the present invention may operate without risk of damage between 600 and 1,200° F., with an optimal temperature of 800° F.

In sum, in embodiments of the invention the unit 142 that houses the catalytic converter 143*a* may be configured to be positioned within a distance from the engine 128 where the temperature of the exhaust optimizes the operation of the catalytic converter 143*a*.

Figure 6:
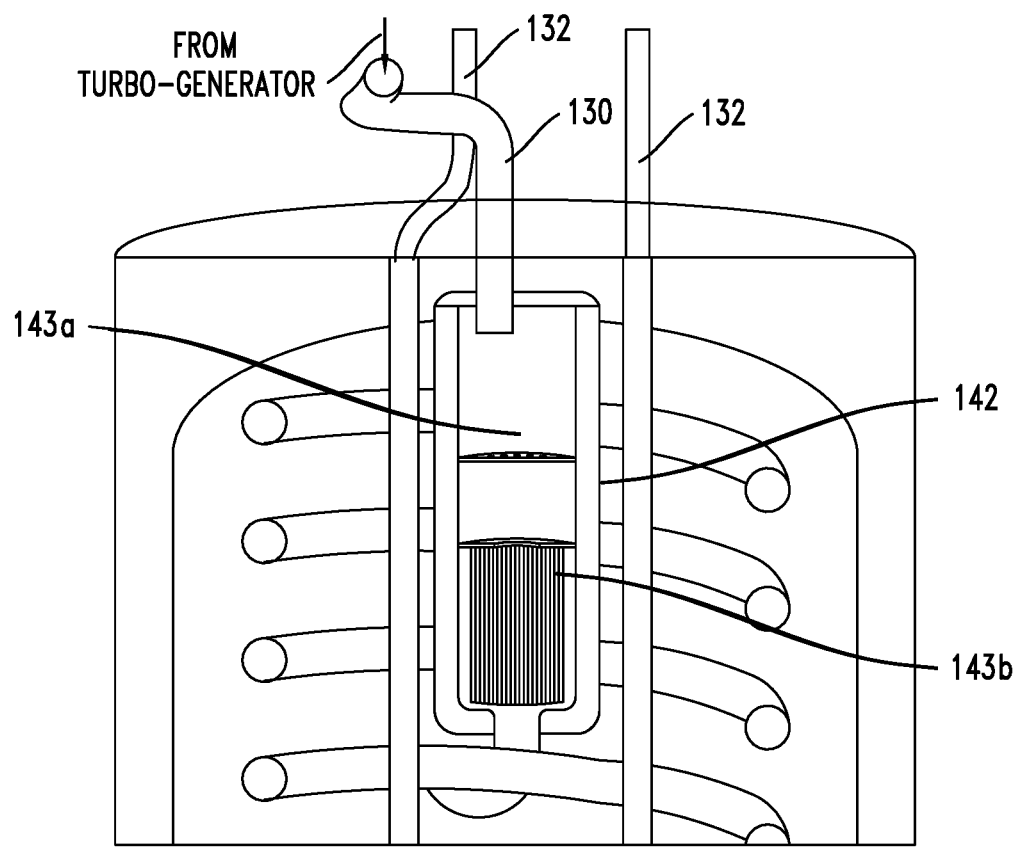
FIG. 6 depicts an enlarged view of a portion of the exemplary energy generation sub-system shown in FIG. 5 in accordance with an embodiment of the present invention.

Referring now to FIG. 6, there is depicted an enlarged view of an exemplary muffler-catalytic converter unit 142. Upon receiving the exhaust, the catalytic converter section 143*a* of unit 142 ("converter" for short) may be operable to convert toxic gases (e.g. oxides of nitrogen (NOx), carbon monoxide) in the exhaust to substantially non-toxic gases (nitrogen, hydrocarbons, carbon dioxide) as well as convert the exhaust into additional heat that may be absorbed by the water 120*a* in the vessel 120 surrounding the converter 143*a*. In an embodiment, section 143*a* may comprise a ceramic structure having layers coated with one or more of a metal catalyst, such as platinum, rhodium and/or palladium, for example. As exhaust enters converter 143*a*, it may impact a first so-called "reduction" layer comprising platinum and rhodium. This layer functions to reduce NOx in the exhaust by converting NO or NO2 molecules in the exhaust to nitrogen. Thereafter, the exhaust may impact a second or "oxidation" layer comprising palladium or platinum that functions to reduce unburned hydrocarbons and carbon monoxide through oxidization (burning) to carbon dioxide and water.

In some embodiments the converter 143*a* may further comprise an oxygen sensor that may be operable to detect a level of oxygen in the exhaust and send signals to a control section (not shown in figures) in order to ensure that a proper stoichiometric balance of treated exhaust is achieved and maintained to ensure appropriate reduction of toxic gases within the exhaust.

In an embodiment, the converter 143*a* may be configured as honeycombed layers or layers of ceramic beads, for example.

After the exhaust is treated in converter 143*a* it may flow to the muffler section 143*b* ("muffler"). In an embodiment, the muffler 143*b* may operable to operable to reduce a level of sound generated by the engine 128 and exhaust gases, for example, to less than 60 dB. Such sound reduction is desirable in order to place the system 100 within a house or dwelling 200. Said another way, absent the muffler 143*b*, the engine 128 may generate sound at a level that would be irritating to the inhabitants of the house or dwelling 200. Further sound reduction may be achieved by embedding the muffler 143*b* within the storage vessel 120 such that any sound that is not reduced by the muffler 143*b* may be dampened or otherwise reduced by the water within the vessel 120, In an embodiment the level of sound escaping the vessel 120 may be less than 60 dB, for example. Yet further, because the muffler 143*b* is configured within the vessel 120 it is less likely to be exposed to conditions (air) that would lead to its corrosion. Thus, it is expected that the useful life of the muffler is lengthened by embedding it within vessel 120. In an embodiment, the muffler 143*b* may be made from a stainless steel, for example.

As mentioned previously the unit 142 may be embedded within water 120*a* within the vessel 120 in order to transfer heat from such components to the water 120*a* in order to capture energy in the form of heat from the exhaust. It should be noted that when the converter 143*a* that is a part of unit 142 is so embedded, the temperature of the converter 143*a* may eventually equal the temperature of the water 120*a* inside the vessel 120. In an embodiment, this allows the converter 143*a* to be more efficient than existing converters. In more detail, during operation of the engine 128 the temperature of the water 120*a* in the vessel 120 may be in the range of 100° to 160° F. Accordingly, the embedded converter 143*a* will be at the same temperature at some point (or, at least a higher temperature than ambient). In an embodiment, the converter 143*a* may be operable to reach an optimum operating performance once it has reached an optimum operating temperature. Accordingly, because the temperature of embedded converter 143*a* may be maintained at an elevated temperature the converter 143*a* may reach (and maintain) an optimum operating temperature more quickly than converters that are not so embedded. In an embodiment, because the converter 143a can operate at an optimum operating temperature it may be able to more effectively remove toxic gases and elements from the exhaust within piping 130.

In an embodiment, the unit 142 may be configured to be easily replaceable. For example, in one embodiment the unit 142 may be replaced by removing some or all of the exhaust heat exchanger 130 and lifting the unit 142 out of the sub-system 101.

Continuing, upon being treated by the unit 142 the exhaust may flow to the exhaust heat exchanger that may be operable to transfer heat within the exhaust gases to water 120a within the vessel 120. In an embodiment the heat exchanger 130 may comprise a plurality of coiled piping (i.e., coils) that are embedded in water 120a within vessel 120. The coils 130 may comprise a thermally conductive material, such as stainless steel, for example.

In an embodiment, as the heated exhaust flows through coils 130 it heats the coils 130 which in turn heat the surrounding water 120a. Thus, heat is transferred from the exhaust into the water 120a. Thus, the sub-system 101 can be said to capture energy in the form of heat that would ordinarily have been lost if the exhaust was simply discharged to the atmosphere outside of the dwelling or house 200. The water 120a that has been heated may be used as hot water for inhabitants (via plumbing and appliances) of the dwelling or house 200.

FIG. 5 further depicts exhaust output piping 120b and an exhaust condensation drain 120c. In an embodiment, after the exhaust exits the coils 130 it may enter the piping 120b and be safely expelled or otherwise output to the atmosphere or environment exterior to the dwelling or house 200. As the exhaust traverses the piping 120b it may undergo additional cooling. Accordingly, some of the gases within the exhaust may be converted to a liquid and flow back down the piping 120b towards the bottom of the piping 120b. In an embodiment, the piping 120b and drain 120c may be configured to allow such liquid to escape the bottom of piping 120b through drain 120c.

As noted previously, the sub-system 101 may be operable to capture heat that would otherwise be wasted from both the exhaust and from the engine 128. We now turn to a discussion of the later.

Referring again to FIG. 5, sub-system 101 may further comprise a pump 132a that may be operable to provide a coolant (e.g., water) at a desired temperature and pressure to the engine 128.

As the coolant absorbs heat from the engine 128, the coolant flows away from the engine 128 via coolant heat exchanger 132 (e.g. coiled piping or coils) that may be operable to transfer heat from the coolant to the liquid 120a within the vessel 120. In an embodiment, coils 132 may comprise an exemplary, thermally conductive material, such as stainless steel.

Similar to coils 130, as heated coolant flows through coils 132 it heats the coils 132 which in turn heat the surrounding liquid 120a. Thus, heat is transferred from the coolant into the water 120a. Thus, once again the sub-system 101 can be said to capture energy in the form of heat that would ordinarily have been lost if the heat from the coolant was simply discharged. The water 120a that has been heated may be used as hot water for inhabitants (via plumbing and appliances) of the dwelling or house 200.

Once the coolant has travelled through the entire set of coils 132 it may enter the pump 132a prior to being re-introduced into the engine 128.

Accordingly, the sub-system 101 captures or recovers heat from both the exhaust and coolant.

Backtracking somewhat, the sub-system 101 depicted in FIG. 5 may further include additional features that make the sub-system 101 highly efficient and/or substantially noise free. For example, as shown the sub-system 101 may further comprise thermo-acoustic insulation 144 (e.g., insulating foam) configured inside the internal surface of the top section or cowling 101a of sub-system 101. In an embodiment, the cowling 101a may be configured to cover the top and sides of the engine 128 and functions to prevent outside contaminants from interfering with the operation of the engine 128. In addition, the insulation 144 functions to absorb or otherwise prevent sounds emanating from inside the cowling 101a due to, for example, operation of the engine 128, from escaping the cowling 101a and causing irritation to inhabitants of the dwelling or house 200 in which the system 100 is installed. Yet further, the insulation 144 functions to prevent air 121b within the cowling from escaping, and instead the air 121b is drawn into the engine 128 through air intake section 113b. In an embodiment, the air intake section 113b may comprise a filter (not shown) that functions to remove contaminants in the air that might otherwise cause the engine 128 to malfunction if the contaminants were not so removed. As depicted in FIG. 5, the air intake section 113b may be positioned so that external air 121c from outside the sub-system 101 that is drawn into the cowling 101a through an external make-up air supply section 113a (e.g., piping) is first able to flow over the engine 128 and generators 128a,b in order to provide additional cooling of the engine 128 and generators 128a,b before such, now heated air 121b is taking into the intake air section 113b. Said another way, rather than position the air intake section 113b immediately next to the supply section 113a, which would then direct air 121c into the engine 128 to be mixed with fuel and combusted, but would make the air 121c unavailable to cool the engine 128 and generators 128a,b the air intake section 113b is positioned at a distance from the supply section 113a so that air 121c can first flow over the engine 128 and generators 128a,b, in effect transferring some of the heat from the engine 128 and generators 128a,b into the flowing air 121c. The now heated air 121b may then enter the intake section 113b. In an embodiment, in addition to positioning the intake air section 113b so that external air 121c may flow over and cool the engine 128 and generators 128a,b, such a position also allows for the air 121c to be heated, in effect allowing "pre-heated" air 121b to enter the engine 128 via the air intake section 113b. The ability to input pre-heated air functions to make combustion of the fuel more energy efficient.

As noted above, the supply section 113a may comprise piping (e.g., a polyvinyl chloride material, "PVC"). In an embodiment, the openings 113d that receive the piping 113a (as well as exhaust piping 120b which may also comprise PVC) may be sealed using, for example, a gasketing and latch configuration. In addition, due to the operation of the engine 128, air in the cowling 101a will be drawn into the engine 128 causing a pressure gradient inside the cowling 101a to form. In an embodiment, this pressure gradient may prevent leakage of any air from inside the cowling 101a to the outside surroundings.

As noted, provided the engine 128 is operating, air within the cowling 101a be drawn from the supply section 113a, over the engine 128 and generators 128a,b and into the air intake section 113b. However, when the engine 128 is not operating (or not operating correctly) a sufficient amount of air may not be drawn into the cowling 101a via the supply section 113a. Should this situation occur, the temperature and pressure of the air that is already inside the cowling 101a that has been heated by the engine 128 may rise to level that may adversely affect the operating efficiency of the engine 128. To mitigate such an affect, in an additional embodiment subsystem 101 may comprise one or more fans 113c ("fan"). In an embodiment, the fan 113c may be positioned in-line with the top of the exhaust piping 120b, for example. The fan 113c may be operable to create a negative pressure in order to draw air out of the cowling 101a in order to reduce the affects discussed above thus, allowing the engine 128 to function properly.

The sub-system 101 may include additional components. For example, a fuel injector 128d that functions to control the amount of a fuel source that is injected into the engine 128 to be mixed with air intake and an intake air valve train 128e are shown in FIG. 5.

As noted previously, the sub-system 104 may be operable to store energy. This energy may be used by an inhabitant of the dwelling or house 200 or, alternatively, be delivered back to an electric utility's grid in return for compensation or credits, for example.

Yet further, in an embodiment, a utility may install controls (not shown in figures) that permit the utility to request and receive energy stored within sub-system 104 as needed. For example, it is known that many utilities must pay (other utilities, or energy source providers) a substantial premium to supply electrical energy to residential and commercial customers during "peak" energy time periods (e.g. when everyone turns their air conditioners on over the same time period during the summer months). This premium may amount to 25% or more of a utilities' yearly cost of providing electricity. In contrast, the embodiments of the present invention when combined with required controls allows such a utility to request and receive additional power from energy storage sub-section 104 instead of another utility at a lower cost.

Still further, embodiments of the invention may lower a utility's cost of producing electricity in yet another way. For example, it is known that a substantial amount of energy from an energy source (coal) is lost between the time the energy source is used by a utility to generate electricity at an operating plant and the time the energy is actually delivered to a remote customer. By some estimates, 65% of the energy generated is lost by the time it is delivered to a customer's traditional heating and electrical system. In comparison, experiments completed by the inventors demonstrate that systems provided by the invention, such as system 100, installed at a location 200 where the heat and electricity will be utilized have the capability of delivering approximately 60% more energy than traditional heating and electrical systems.

The following description provides a more detailed description of an exemplary engine that may be used as a part of an exemplary system in accordance with an embodiment of the invention.

Exemplary Four-Stroke Opposed Piston Engine

Certain novel aspects of the present invention, with regard to an exemplary engine for example, are presented below as well as in the '711 Application. Further, U.S. Pat. Nos. 7,004,120 and 7,779,795, and U.S. patent application Ser. Nos. 15/442,617 and 13/633,097 are related to the present invention, of which the teachings of each document are herein incorporated by reference in their entireties.

Figure 7:
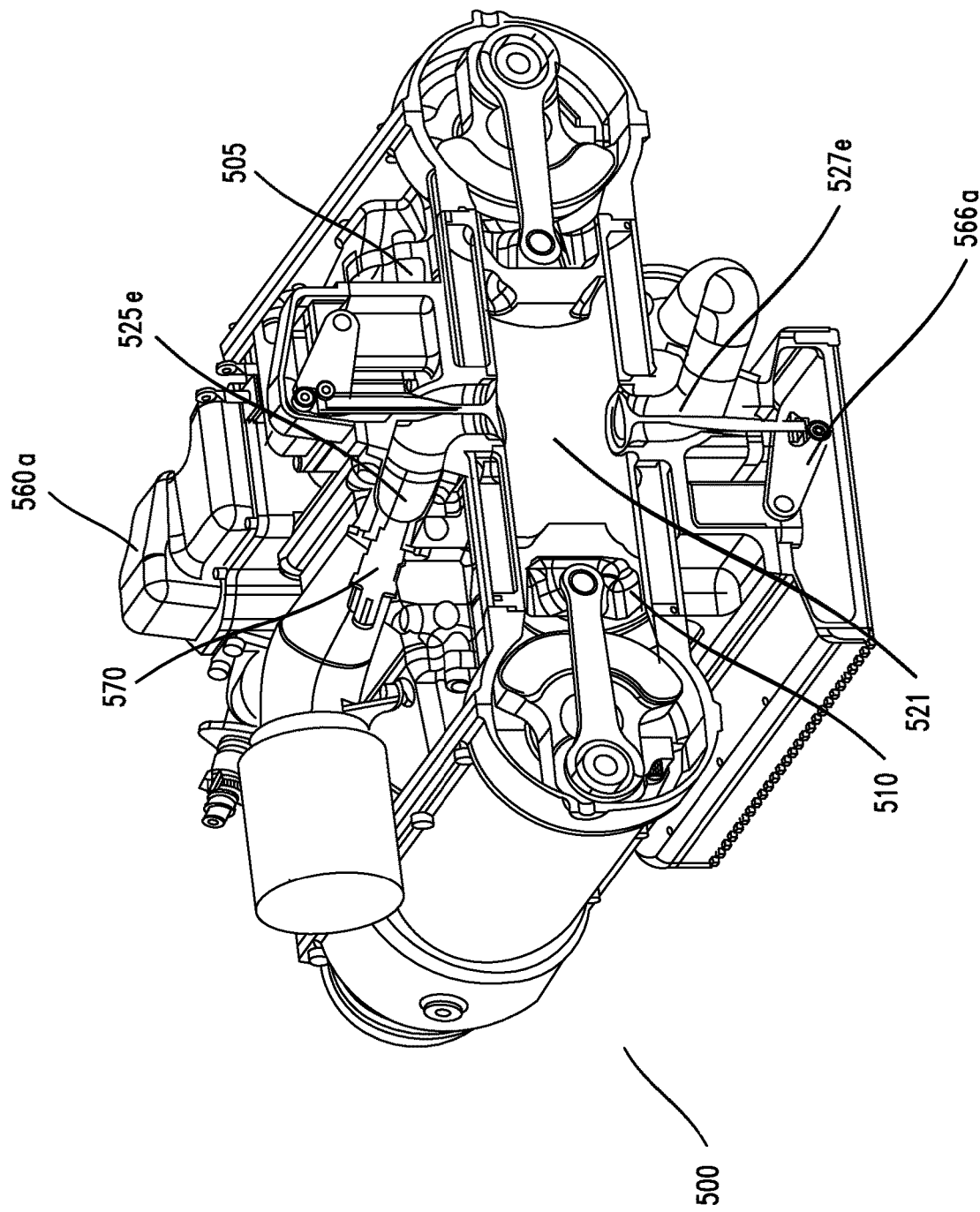
FIG. 7 is a cross-sectional view of two exemplary opposed pistons within an associated cylinder of an exemplary engine in accordance with an embodiment of the present invention.
Figure 8:
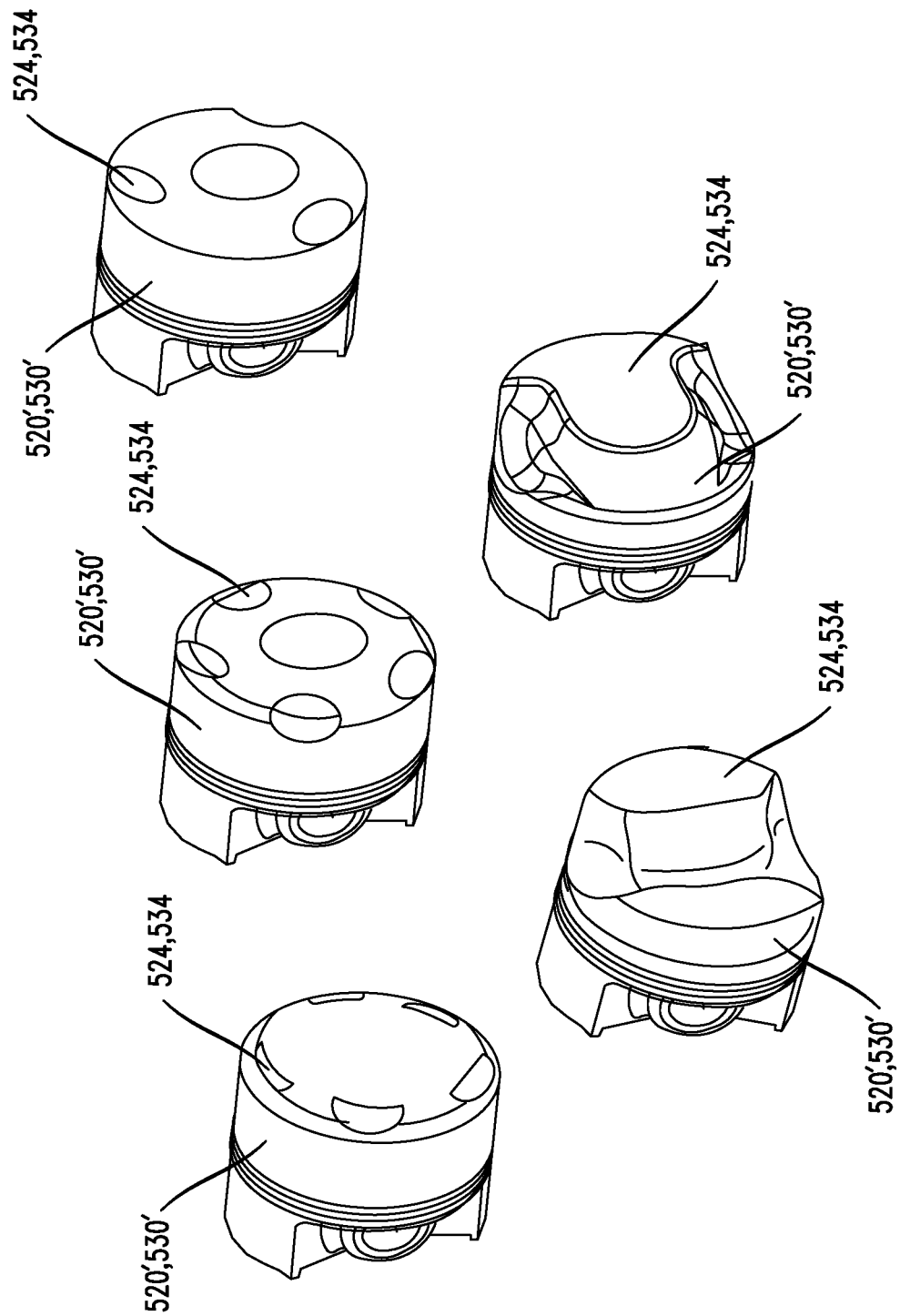
FIG. 8 illustrates various piston faces in accordance with embodiments of the present invention.
Figure 10:
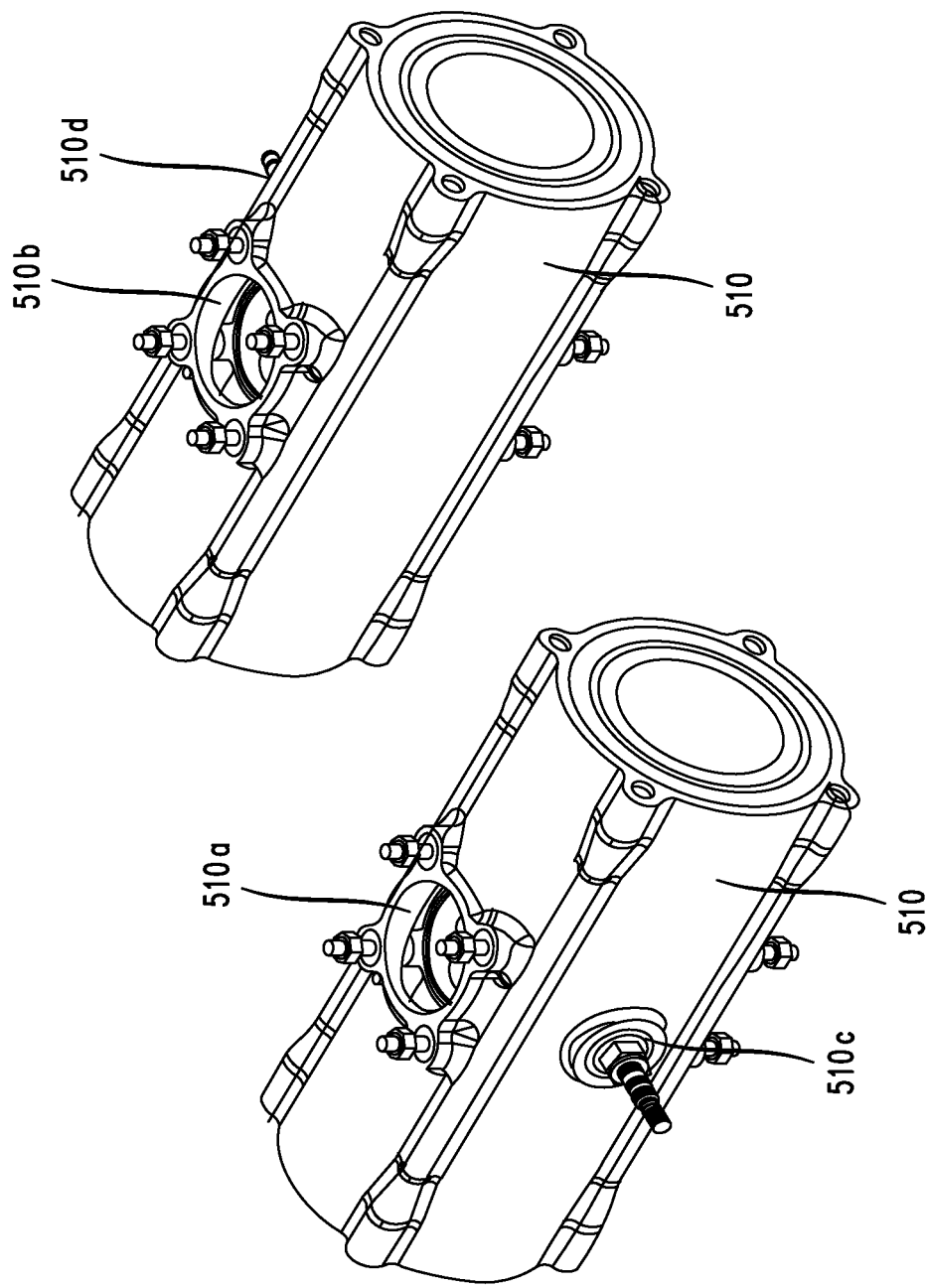
FIG. 10 illustrates two exemplary cylinders in accordance with embodiments of the present invention.

Referring to FIG. 7, an opposed piston engine 500 (or 128 in FIG. 5) may comprise an engine housing 505 (see FIG. 7 for example) containing a first cylinder 510 and a second cylinder 510' (see FIG. 10, for example). A first pair of opposed pistons 520 and 530 are housed within the first cylinder 510 (see FIG. 11, for example). A second pair of opposed pistons 520' and 530' are housed within the second cylinder 510'. Although discussion is directed to the first cylinder 510 containing pistons 520 and 530, the same discussion may be applied with regard to second cylinder 510' and opposed pistons 520' and 530' (and/or vice-versa).

Opposed pistons 520 and 530 are connected via respective connecting rods 522 and 532 to respective crankshafts 540 and 542 mounted in engine housing 505 as described in U.S. Pat. No. 7,004,120. Pistons 520 and 530 reciprocate within cylinder 510 to rotate the crankshafts, in a manner known in the art. Each associated crankshaft and/or connecting rod is configured to aid in providing a predetermined stroke length to its associated piston residing within the cylinder. The opposed first and second pistons 520 and 530 may be of a relatively standard design and may have predetermined lengths and predetermined diameters.

In one embodiment, the stroke length of each of pistons 520 and 530 may be about 3 inches. Thus, the total difference between the spacing of the pistons at closest approach to each other (i.e., at "top dead center") may range from 0 inches to 0.25 inches, and more preferably from about 0.05 inches to 0.2 inches, and the maximum spacing of the pistons during the engine cycle (i.e., at "bottom dead center") is about 4-7 inches, and more preferably about 6 inches. As will be apparent to one of ordinary skill in the art, these distances may be altered depending on specific design criteria.

Figure 9:
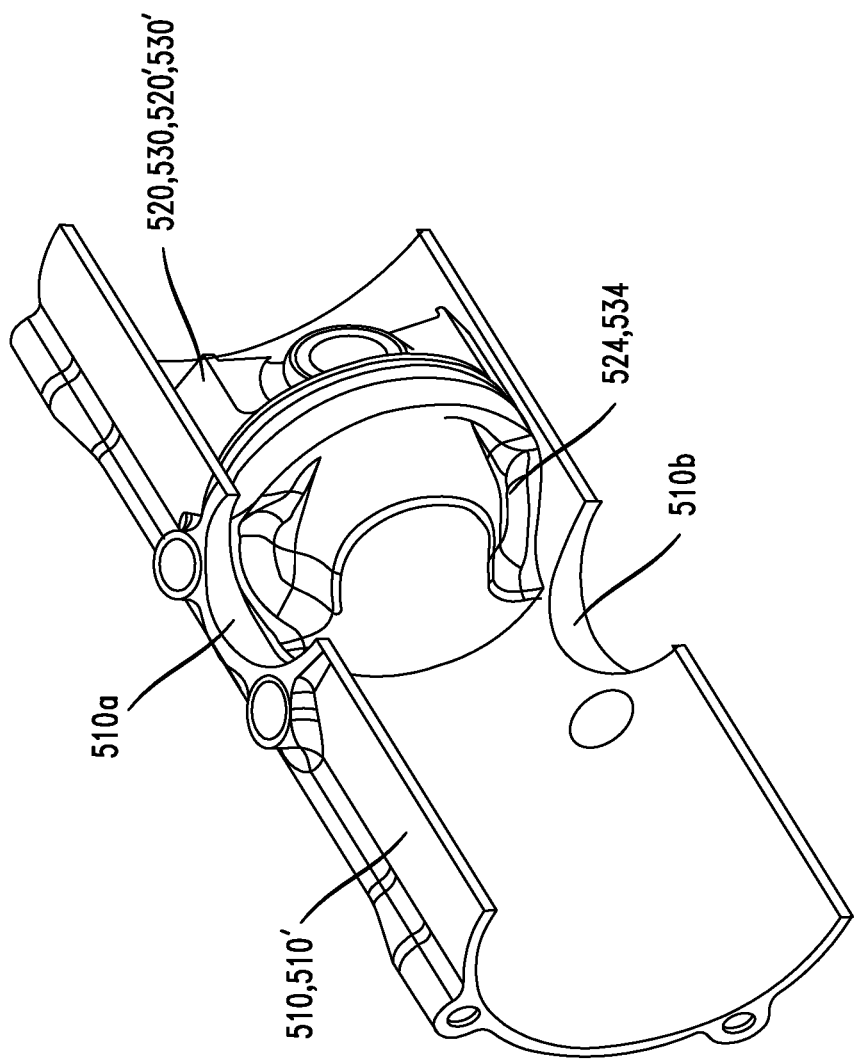
FIG. 9 illustrates a perspective cross-section of the combustion chamber and piston face in an exemplary engine in accordance with an embodiment of the present invention.

If desired the length and timing of the engine's stroke may be adjusted (to substantially equal lengths) for controlling the spacing between the piston faces, thereby providing a means for adjusting the compression ratio and generally providing a predetermined degree of compression for heating intake air to facilitate combustion of a fuel injected or otherwise inserted into the combustion chamber. The piston lengths may be geometrically determined in accordance with the piston stroke length and the lengths of apertures (described below) formed in the cylinders through which flow exhaust gases and air for combustion. In one embodiment, each piston cap 524 and 534 (see FIG. 9) may comprise a sandwich of two sheets of carbon fiber with a ceramic center. The piston caps 524 and 534, which are exposed to a combustion event, may be formed so that when the two piston caps 524 and 534 meet in the center of the cylinder 510 they preferably form a somewhat toroidal, hour-glass-shaped, or otherwise-shaped cavity as the combustion chamber 521 (see FIG. 11, for example). In an embodiment, only the ceramic cores of the piston caps 524 and 534 actually come into contact with the stationary cylinder wall.

Each piston should have a length from the piston fire ring to the cap suitable for keeping the piston rings out of the cylinder opening(s) 510a. The piston caps 524 and 534 each have a diameter roughly equal to the interior of the associated cylinder, and may be made of carbon fiber, ceramic, or any other suitable material to aid in minimizing thermal inefficiencies during engine operation.

In an embodiment utilizing a delivery conductor and ground conductor for spark generation (as described in U.S. Pat. No. 7,448,352), the face of each piston may also include a slot(s) or groove(s) formed therein and configured for providing a clearance between the piston face and the delivery and ground conductors, as the pistons approach each other within the cylinder.

Figure 12:
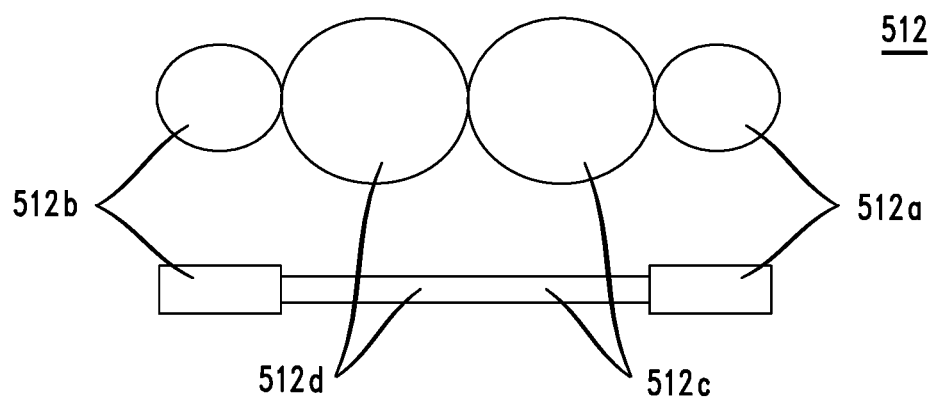
FIG. 12 illustrates a geared drive system in accordance with an embodiment of the present invention.
Figure 13:
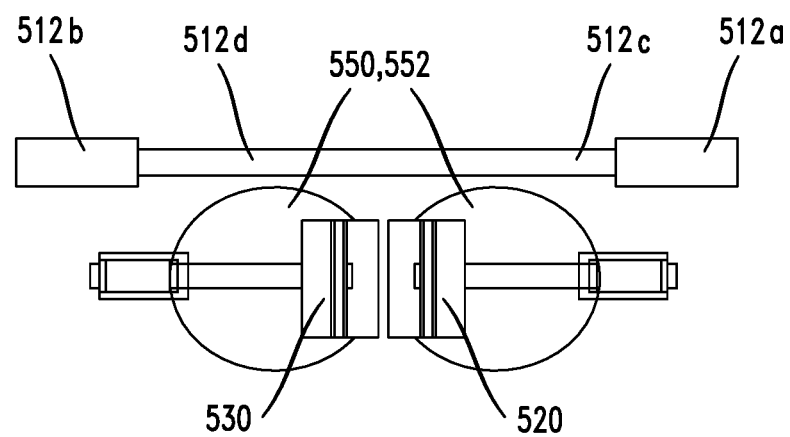
FIG. 13 illustrates a geared drive system in accordance with an embodiment of the present invention.

FIGS. 12 and 13 each show exemplary side and plan views of a gear train 512. As shown, gears 512a, 512b connected to crankshafts 542, 540 (not shown in FIGS. 12 and 13) respectively, rotate at crankshaft speed but are reduced in size to serve as reducing gears. Thus, the rotational speeds of the gears 512*c* and 512*d* (and the rotational speeds of the cam discs 520, 522, 520', and 522' to which they are connected) may be reduced to one half of the crankshaft speed.

Various elements of a vehicle and/or engine system (for example, an oil pump or coolant circulation pump) may be operatively coupled to, and powered by, the gear train 512, via the gears in the gear train itself or via shafts and additional gears operatively coupled to the gear train 512.

Figure 11:
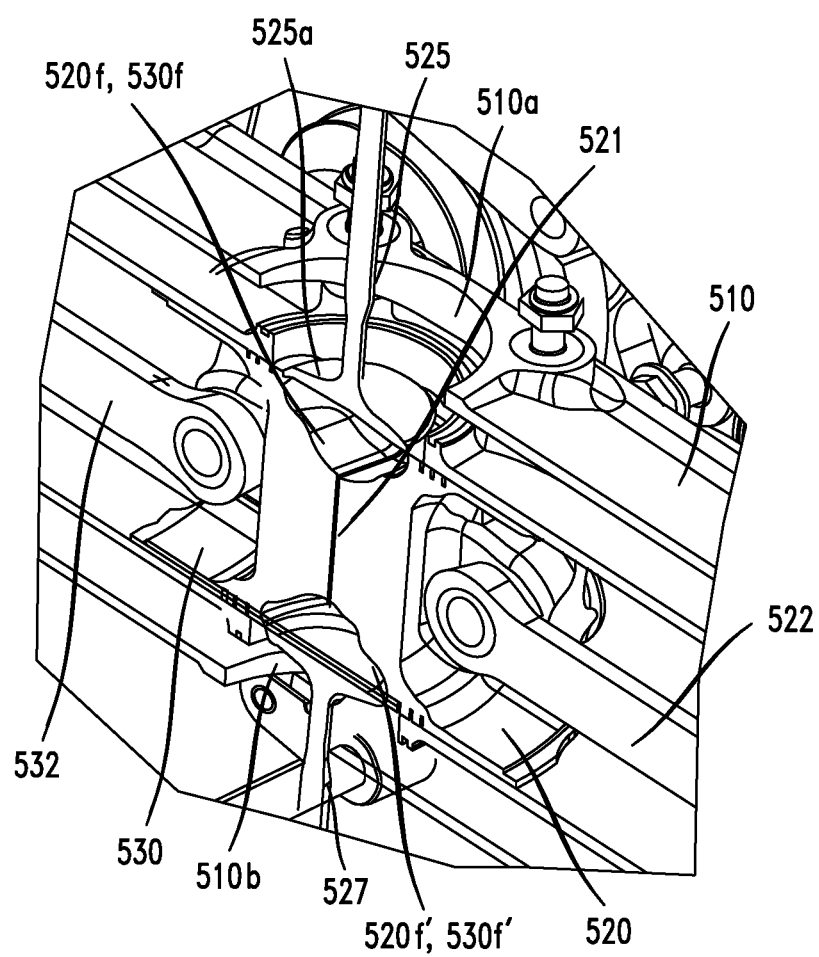
FIG. 11 illustrates two pistons at top dead center, in accordance with an embodiment of the present invention.

Exemplary housing components of an exemplary engine are illustrated in FIG. 11. FIG. 11 illustrates the cylinders 510, 510' comprising cylinder openings 510*a* and 510*b*, and spark plug openings (only the former is shown in FIG. 11).

Referring still to FIG. 11, there is illustrated an exemplary interface of two opposed pistons whereby the piston cap interface at top dead center (TDC) forms a toroidal combustion chamber 521. The valves 525 and 527 may also be seated or configured within opposed detents or cavities 520*f*, 530*f*, 520*f'*, 530*f'* formed as a part of the top and bottom of the pistons, that when combined, function to seal a valve/piston interface during the four-stroke process, and during operation of valves as they open and close.

It should be understood that the preceding is merely a detailed description of various embodiments of the invention and that numerous changes to the disclosed embodiments can be made in accordance with the disclosure herein without departing from the scope of the invention. The preceding description, therefore, is not meant to limit the scope of the invention. Rather, the scope of the invention is to be determined only by the appended claims and their equivalents.

We claim:

1. A combined heat and power system comprising:
an energy generation sub-system comprising,
    a replaceable engine connected to a plurality of generators and a turbo-generator,
    the generation sub-system further comprising a catalytic converter, embedded in a vessel for storing liquid heated by waste heat from the engine, and configured to be positioned within a distance from the engine, where a temperature of exhaust gases optimizes the operation of the catalytic converter; and an energy distribution sub-system comprising,
    coils operable to circulate heated coolant received from the energy generation sub-system, and,
    fans operable to direct air over the coils to heat the directed air, and operable to distribute the heated air.

2. The system as in claim 1 further comprising a muffler embedded in the vessel and operable to reduce a level of sound from the engine and the exhaust gases.

3. The system as in claim 1 further comprising a coolant heat exchanger operable to transfer heat from coolant to the liquid within the vessel.

4. The system as in claim 1 further comprising an air intake section configured to be positioned so that external air from outside an energy generating sub-system is drawn into a cowling and over an engine and generators in order to cool the engine and pre-heat the air.

5. The system as in claim 1 further comprising an air intake section configured to be positioned so that external air from outside an energy generating sub-system is drawn into a cowling, having thermo-acoustic insulation configured inside the cowling to prevent sounds emanating from inside the cowling from escaping the cowling, and over an engine and generators in order to cool the engine and pre-heat the air.

6. A method for providing heat and power comprising:
generating electricity and exhaust gases from an engine;
storing a liquid, heated by waste heat from the engine, in a vessel;
embedding a catalytic converter in the vessel at a position where a temperature of the exhaust gases optimizes the operation of the catalytic converter; and
circulating heated coolant through coils and directing air over the coils to heat the directed air, and distributing the heated air.

7. The method as in claim 6 further comprising embedding a muffler in the vessel to reduce a level of sound from the engine and the exhaust gases.

8. The method as in claim 6 further comprising transferring heat from coolant to the liquid within the vessel.

9. The method as in claim 6 further comprising positioning an air intake section so that external air is drawn over an engine in order to cool the engine and pre-heat the air.

10. The method as in claim 6 further comprising preventing sounds emanating from inside a cowling from escaping the cowling.

* * * * *